May 5, 1970  G. R. MacLEOD  3,509,638
TREATING APPARATUS

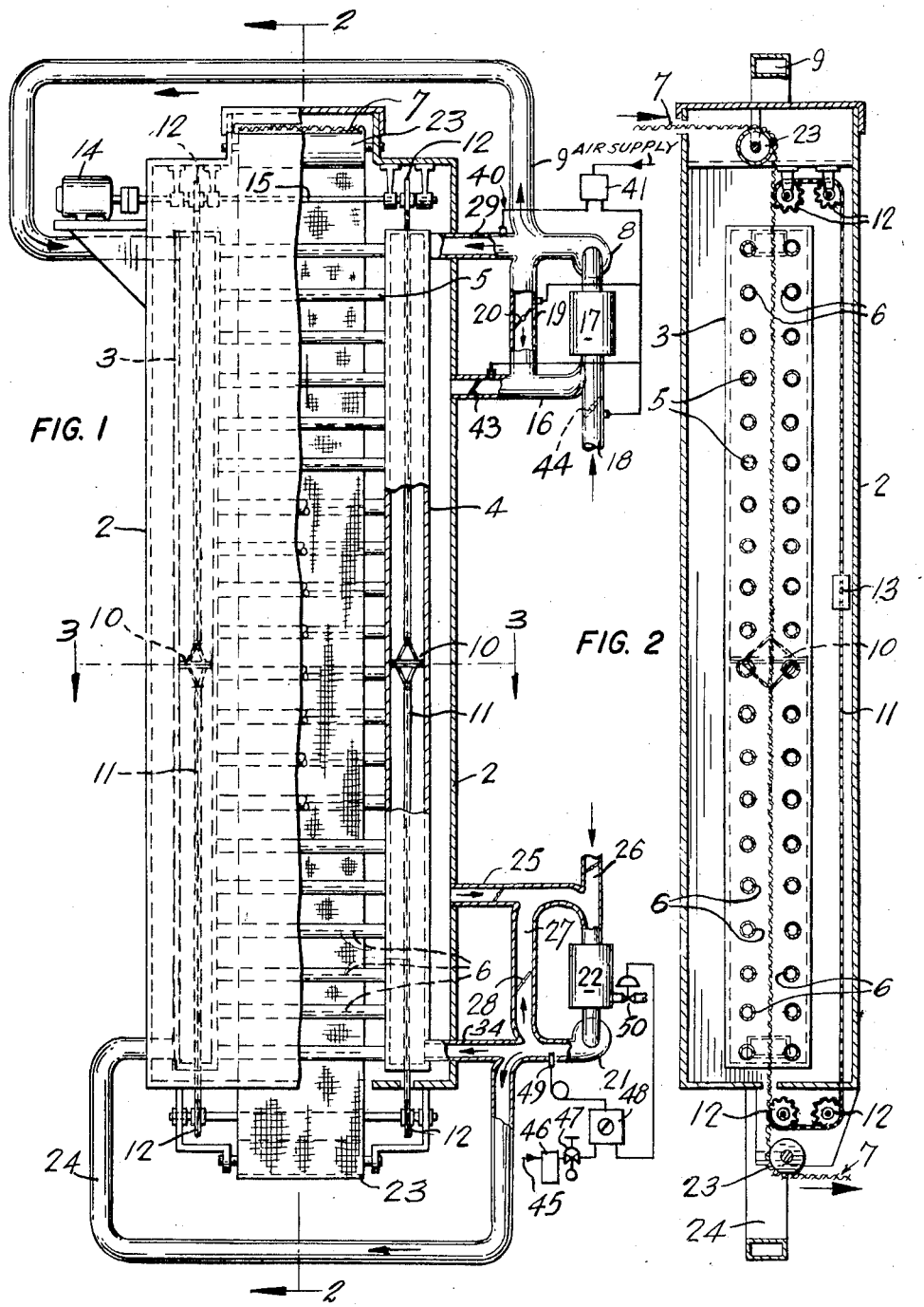

Filed April 3, 1969  2 Sheets-Sheet 2

INVENTOR
Gordon Ross MacLEOD

Alan Swabey
ATTORNEY

United States Patent Office 3,509,638
Patented May 5, 1970

3,509,638
TREATING APPARATUS
Gordon Ross Macleod, Pointe Claire, Quebec, Canada, assignor to Midland-Ross of Canada Limited, La Salle, Quebec, Canada
Continuation-in-part of application Ser. No. 656,538, July 27, 1967. This application Apr. 3, 1969, Ser. No. 813,164
Claims priority, application Great Britain, Aug. 4, 1966, 35,013/66; Canada, Aug. 3, 1967, 997,065
Int. Cl. F26b 21/00
U.S. Cl. 34—54
15 Claims

ABSTRACT OF THE DISCLOSURE

Apparatus for treating material comprising a treatment chamber, and a plenum in the chamber supplied with a treatment medium. The plenum has openings for directing the treating medium against the material passed through the chamber. The plenum also has a movable baffle in it for varying the effective length of the plenum chamber.

---

This application is a continuation-in-part of application Ser. No. 656,538, filed July 27, 1967, now abandoned.

BACKGROUND OF THE INVENTION

Field of invention

This invention relates to an improved method and apparatus for treating material.

More particularly, the invention relates to an improved method and apparatus for treating material which is passed through a substantially enclosed, elongated, treating chamber and where a treating medium is fed to the chamber and directed, from within the chamber, against at least one surface of the material to treat it.

Description of prior art

In treating apparatus of the above general type, means must be provided for varying the rate of treatment of the material as it passes through the chamber. For example, in the particular treatment application of drying web material, means must be provided for ensuring that the web is dried uniformly. This is difficult to achieve if the speed of travel of the web varies in its passage through the chamber. Means must also be provided for adjusting the apparatus to treat different types of material. One material may require more treating medium than a different material.

One solution is to pass the web through the chamber by running it in one end, over a movable roller within the chamber located at or adjacent the other end, and back out the one end. The position of the roller can be adjusted toward or away from the one end to vary the amount of web material within the chamber at any one time depending on its speed or the amount of treating medium required. For a constant temperature and flow of heated air into the chamber the faster the web travels the more of it that must be located in the chamber in order to dry the entire web to a constant value. The movable roller construction is however cumbersome and expensive.

In other drying applications heated air is blown against the web surface from a plurality of spaced apart nozzles connected to a plenum chamber within the drying chamber. Movable screens are located between the nozzles and web for blocking off the flow of treating medium from the spaced apart nozzles to the web. The position of the screen and thus the number of nozzles blocked off depends on the web speed, and the screens can thereby control the amount of hot air that impinges against the web surface and thus theoretically control the degree of dryness of the web. The movable blocking screens generally comprise a plate or curtain slidable between the row of nozzles and web and spaced from both. This type of apparatus has the disadvantage that the blocked-off nozzles still direct hot air into the chamber from the plenum since their outlets are not closed, thus raising the temperature of the chamber and causing additional drying of the web, thus making it difficult to control the degree of dryness.

The present invention is directed to an improved method and apparatus for overcoming the above disadvantages.

SUMMARY OF INVENTION

Broadly stated, the invention is directed towards a method for treating material in an elongated enclosed treating chamber comprising the steps of passing the material longitudinally through the chamber, directing a treating medium, through a plenum chamber within the treating chamber, against at least one surface of the material during its passage through the treating chamber and controlling the directing of the treating medium, within the plenum chamber, to vary the area of the surface of the material against which the treating medium is directed.

The invention is also directed toward an apparatus for treating material comprising a substantially enclosed treating chamber, means for passing the material through the treating chamber, means for directing a treating medium against at least one surface of the material during its passage through the chamber, said directing means including a plenum chamber within the enclosed chamber and means within the plenum chamber for varying its effective length in order to vary the length of the surface of the material within the treatment chamber against which the medium is directed.

The apparatus includes a plurality of spaced apart ducts in open communication with and extending from the plenum chamber and positioned in at least one row substantially throughout the treating chamber adjacent the path of travel of the material through the chamber. The treating medium is passed into one end of the plenum chamber, through the plenum chamber and out the ducts against the material surface. The plenum chamber contains a baffle means movable within the chamber to different positions to vary the effective length of the chamber. The position of the baffle dictates the number of ducts to which the treating medium is supplied from the one end of the chamber and prevents treating medium from passing into the other ducts located on the side of the baffle opposite to the side of which the treating medium is supplied to the plenum chamber.

Means can be provided for automatically varying the position of the baffle in accordance with the change in the speed of the material as it passes through the chamber. For example, the faster the material passes through the chamber, the greater the amount of treating medium which must be directed against it in order to treat it to a constant degree. Thus, automatic control means can be provided for moving the baffle within the plenum chambers to open more of the ducts dependent on the increase in speed causing more of the material surface area to be impinged by the treating medium.

For treating continuous webs or films, two plenum chambers could be located within the treating chamber spaced on either side of the path of travel of the web or film through the treating chamber. The plenum chambers can be connected by two rows of equally spaced apart ducts to direct a treating medium against both surfaces of the web or film.

BRIEF DESCRIPTION OF DRAWINGS

The invention will now be described in detail having reference to the accompanying drawings in which:

FIGURE 1 is a partial vertical cross-section through a treating apparatus according to the invention;

FIGURE 2 is a section along line 2—2 through FIGURE 1;

DESCRIPTION OF PREFERRED EMBODIMENTS

Figure 3:
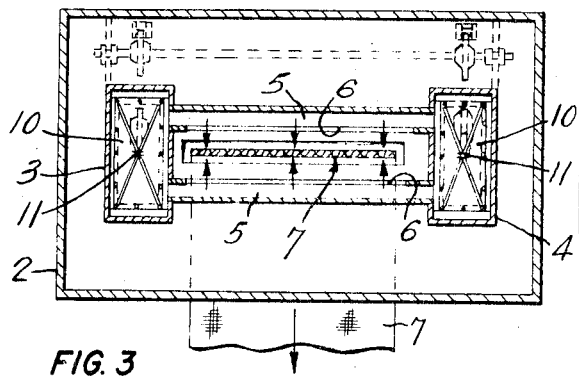
FIGURE 3 is a section along line 3—3 of the structure shown in FIGURE 1 showing the movable baffles within the plenums.
Figure 4:
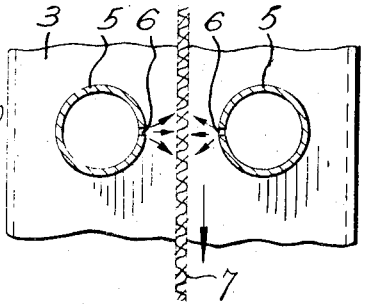
FIGURE 4 is an enlarged fragmentary horizontal cross-section of a portion of FIGURE 2 showing details of the nozzles.

Having reference to FIGURES 1, 2, 3 and 4, these illustrate a treatment apparatus having an elongated substantially closed treatment chamber 2. Within the treatment chamber are two plenum chambers 3, 4 extending a substantial portion of the length of the treatment chamber with a plurality of equally spaced apart ducts 5 interconnecting the two plenum chambers. The plenum chambers are located at the sides of the treatment chamber and mounted therein by suitable means (not shown). The ducts 5 are arranged in two parallel rows as shown in FIGURE 2, with the ducts in one row located opposite the ducts in the other row to form therebetween a path through which a web or film 7 to be treated is passed. The ducts 5 have nozzles or slots 6 for directing a treating medium from the plenum chambers onto the surfaces of the web or film 7 as shown in FIGURE 4.

The treatment chamber 2 has a slot opening adjacent its upper end and a second slot opening in its lower end as shown in FIGURE 2. A guide roller 23 is located adjacent and within the upper end of the chamber and a second guide roller 23 adjacent the second bottom outlet slot. The rollers 23 are mounted to the treatment chamber by suitable brackets. Duct means 9, 29 supply a treating medium to or adjacent at least one end of one or both plenum chambers 3, 4 from a source outside the treatment chamber.

The web 7 passes continuously into the treatment chamber through the upper slot opening, around roller 23 and vertically down between the two spaced rows of ducts 5. The web emerges from the treatment chamber through the bottom slot opening and passes around roller 23 for further treatment or storage. During passage of the web through the treatment chamber between the rows of ducts, a treating medium enters the plenum chambers 3, 4 through ducts 9, 29, passes to ducts 5, and out nozzles 6 against both surfaces of the web. The treatment medium, after impinging the web, can be withdrawn from the chamber 2 through an outlet duct 16 in a side wall of the chamber 2.

An essential feature of the apparatus are means within each plenum chamber for controlling their effective length, in order to vary the area of the surface of the web onto which the treating medium is directed through nozzles 6. Preferably, these means comprise a movable baffle 10 within each plenum chamber and in sliding contact with the walls of the plenum chamber. The baffle 10 is connected to drive means for moving the baffle to vary the plenum chambers' effective length. The baffle and drive means can comprise a piston connected to a fluid pressure cylinder which cylinder can be positioned within, at one end, or without the plenum chamber. Alternatively, the baffle can be a plate member as shown in FIGURES 1 and 2, and the drive means can comprise a chain 11 having its ends connected to the opposite sides of the baffle and trained over a set of sprockets 12 located adjacent the guide rollers 23. The chain forms an endless loop passing within the length of the plenum chamber, passing out through its ends, and returning outside the plenum chamber. The openings in the ends of the plenum chamber through which the chain passes are made as small as possible to reduce the leakage of the treating medium from the plenums. A counterweight 13, which is optional, can be attached to the chain as shown in FIGURE 2. One of the sprockets 12 can be driven by motor 14. Where two plenum chambers 3, 4 are used as shown, the shaft 15 of the motor 14 can operate the drive sprockets 12 for both plenum chambers simultaneously, thus moving the chains and thereby positioning the baffles 10 fixed to the chains in the two plenums in the same position. The motor 14 can be operated by an operator in either direction to raise or lower the baffles 10 to any position within each plenum chamber and thereby control the amount of treatment medium directed onto the surfaces of the web passing through the treatment chamber. Alternatively, the operator could move the chains 11 by hand if a portion of the chains is located outside of the treatment chamber as shown in FIGURE 1.

Figure 7:
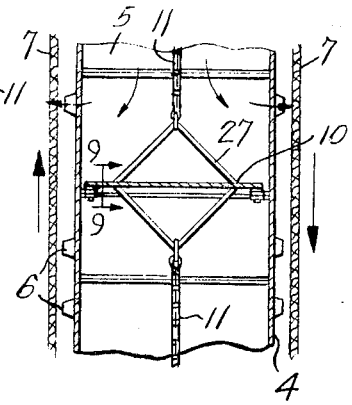
FIGURE 7 is an enlarged view of the baffle shown in FIGURE 6.
Figure 9:
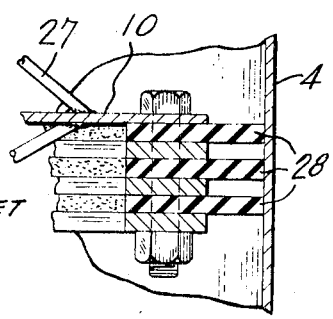
FIGURE 9 is an enlarged fragmentary section showing a preferred form of the baffle seal.

The baffles 10 can, in a preferred form, comprise a plate member substantially similar in size to the inner cross-sectional area of each plenum chamber. Connector rods 27 extend from adjacent the corners of the plate with the ends of the chain 11 attached centrally with respect to the plate to the free ends of the rods as shown in FIGURE 7. Sealing means, as shown in FIGURE 9, comprising a plurality of rubber gaskets 28 spaced apart by spacers and connected to the edge of the plate by nut and bolt connections, can be provided to ensure sealing of the baffle member to the side walls of the plenum chamber. The sealing means prevents the passage of treating medium.

The position of the baffles 10 within the plenum chambers controls the number of spaced apart ducks 5 through which treating medium is passed to be directed onto the surfaces of the web. The baffle blocks off the passage of treating medium to the remainder of the ducts located on the downstream side of the baffle away from the inlet ducts 9, 29. Thus, the treating medium does not pass uncontrollably into the treatment chamber from and throughout the length of the plenum chambers, which, if it occurred, could vary the degree of treatment imparted to the web. The farther the baffle 10 is located from the inlet end of the plenum chamber, the longer the effective length of the plenum chamber and the more ducts 5 which can receive the treating medium. Thus, the more surface area of the web against which the treating medium can be directed through nozzles 6 in those ducts 5 receiving the treating medium.

The motor 14 controlling the position of the baffles 10 can be automatically operated, if desired, in accordance with any change in the speed of travel of the web through the treating chamber. If the web speeds up, for example, the baffles must be moved to permit treating medium to flow through more ducts to treat a greater surface area of the web in order to obtain the same degree of treatment as when the web moved more slowly. The means for automatically controlling operation of the motor 14 as a result of change in web speed can be any well-known device. For example, a pneumatic speed transmitter which converts rotational motion from a roller, guiding the web to the treatment chamber into air pressure output, can be used to operate a pneumatic cylinder with a positioner to adjust the motor to deliver a fixed number of revolutions, thus moving the baffles into the required position to adjust the treating of the web for the change in speed.

While two rows of spaced apart ducts have been shown for treating both surfaces of the web, only one row could be provided for treating one surface of the web if so desired. Similarly, while two plenum chambers have been shown located at the sides of the treatment chamber spaced apart a greater distance than the width of the web passing between them, only one plenum chamber could be used with the ducts extending therefrom being closed off at their free ends. When only one plenum chamber is used, one or two rows of ducts could be used to treat one or both sides of the web.

Figure 5:
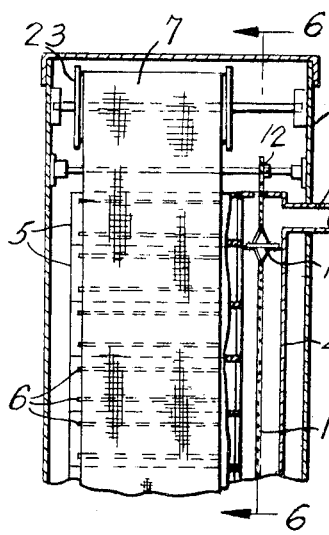
FIGURE 5 is a horizontal cross-section through an alternative form of the apparatus shown in FIGURE 1 having one header and one plenum chamber and where the web of material passes into and out of the treatment chamber from the same end.
Figure 6:
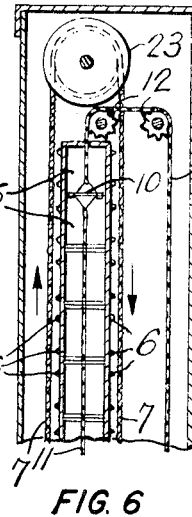
FIGURE 6 is a fragmentary sectional view along line 6—6 of FIGURE 5.

In a further embodiment of the invention as shown in FIGURES 5 and 6, a single plenum chamber 4 can be used with the ducts 5 extending therefrom comprising a series of abutting rectangular shaped ducts. The free ends of the ducts are closed. The sides of the ducts form two continuous surfaces adjacent which the web passes. The treating medium is directed from the ducts 5 against the web through the slots or nozzles 6 on both sides of the ducts. In this embodiment, the web passes into the treating chamber at one end, over one of the continuous surfaces formed by the ducts, over a guide roller 23 mounted within the treating chamber at its other end, over the other continuous surface formed by the ducts and out of the treatment chamber at or adjacent its one end. In this embodiment, only a single row of ducts is required and twice the surface area of one side of the web is treated as compared to the same length of treatment chamber where the web travels in one end and out the other as shown in FIGURE 1.

The apparatus described and shown in either FIGURES 1 or 5 is particularly suitable for drying webs or films. Heated air can be supplied to the plenum chambers 3, 4 through ducts 9, 29. The heated air is supplied from an inlet duct 18, a heater 17 and a fan 8. A return duct 16 removes the heated air from the treatment chamber after it has impinged the web and returns the heated aid back through the heater 17 and the fan 8 for reheating and recirculation. A by-pass duct 19 can be provided on the downstream side of the fan 8 and connected to the return duct 16 for recirculating and balancing the air flow through the system.

Means, as shown in FIGURE 1, can be provided for automatically controlling the pressure of the treating medium, particularly when using heated air, in the plenum chambers dependent on the location of the baffle in order to provide constant air pressure and thus provide a uniform flow of heated air through the nozzles. A pneumatic pressure controller 41 senses inlet pressure in inlet duct 29 through a pressure sensor 40. From this reading, the controller can, by air pressure or other means, automatically open or close dampers 20, 43 and 44 in ducts 19, 16 and 18 respectively to automatically control air flow in relation to the pressure desired within the chamber, in such a manner as to maintain the pressure within the chamber the same at all times. Thus, if the baffles are moved downwardly, thus increasing the effective length of the plenum chamber and providing access for the heated air to more of the ducts 5, the pressure controller will sense a drop in pressure in duct 29 and will operate the valve 20 in the by-pass duct to reduce the amount of air by-passed and increase the air directed into the plenum chamber to maintain the same pressure in the plenum that existed before the baffles moved. Since more air is being directed into the plenum chamber, additional air must be removed from the treatment chamber to maintain a pressure balance within the treatment chamber. Controller 41 can automatically reposition dampers 43, 44 to maintain the pressure balance.

The apparatus can also be used for differently treating material in the treatment chamber in adjacent sections or zones of the treatment chamber. The baffles 10 divide the plenum chambers 3, 4 into two separate distinct sections or zones. Thus, one treating medium could be supplied to the plenum chambers from ducts 9, 29 and a different treating medium, or the same medium having different characteristics, could be supplied to the plenum chambers on the other side of the baffles 10 from ducts 24, 34 located at its opposite end. If a web is to be dried, for example, and it should be heated gradually, warm air could be supplied through the ducts 9, 29 to that portion of the plenum chambers above the baffles 10 to warm the web up in a first zone in the treatment chamber and hotter air can be supplied to the portions of the plenum chamber from ducts 24, 34 located below the baffles 10 to finally dry the heated web in a second zone. Using the baffles to divide the plenum chambers into two separate sections or zones, and providing inlets at or adjacent both ends of each plenum chamber, provides a treating chamber having two separate treatment zones.

If used for drying with inlets at or adjacent both ends of the plenum chambers, a second lower separate heating, recirculating and by-pass system identical to that previously described in connection with the upper inlet ducts 9, 29 can be used to supply heated air to the lower inlet ducts 24, 34. As shown in FIGURE 1, the second system would also include an air inlet duct 26, a heater 22 and a blower 21 directing heated air to inlet ducts 24, 34. A duct 25 returns air from the treatment chamber for recirculation to heater 22. A by-pass and recirculation duct 27, downstream from the blower 21, can be used to control the flow of air to the treatment chamber. An adjustable damper 28 is located in the by-pass duct 27.

Pressure controlling means identical to that used in connection with the upper system can be used in the lower system.

A temperature controlling system can be used with the upper heated air supply system or with both the upper and lower heated air supply systems. The temperature control system senses the temperature of the air entering the treating chamber and adjusts the heater accordingly in order to supply air at constant temperature. As shown in FIGURE 1 (in connection with the lower system only in order not to clutter the drawing), the temperature control system comprises a temperature control 48 which can be set to provide the desired temperature in the treating chamber. The control 48 is pneumatically operated by a source of plant air 45, passing through a filter 46 and pressure reducing valve 47. A sensor 49 in duct 34 senses the temperature of the heated air entering the treatment chamber. This temperature reading is compared in controller 48 with the desired temperature and, if they differ, the controller will operate a valve 50 in the fuel supply to the heater 22 to adjust its operation and thus raise or lower the temperature of the air entering the treating chamber until it is the same as that desired.

Figure 8:
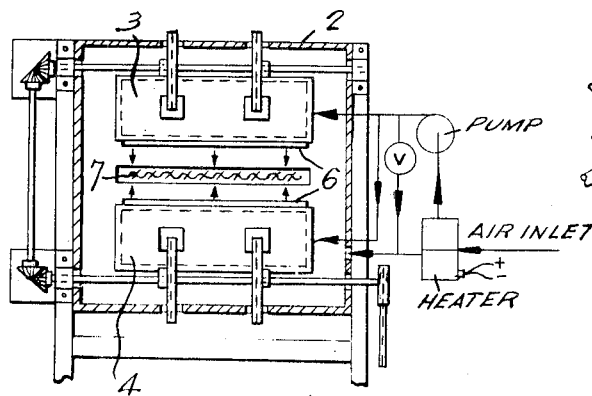
FIGURE 8 shows a further alternative arrangement where the dryer is mounted horizontally and in which the plenum chambers extend the width of the chamber.

The treatment chamber has been described in connection with treating a web passing unsupported adjacent the nozzles 6 in a vertical direction. The treatment chamber could, of course, be located horizontally as shown, for example, in FIGURE 8. In FIGURE 8, the plenum chambers 3, 4 are located and extend directly over and under the web surfaces. No separate interconnecting ducts are required. The side surfaces of the plenum chambers 3, 4 facing and adjacent the path of travel of the web 7, have a plurality of spaced apart slots or nozzles 6 formed therein extending transversely to the direction of web travel. The treating medium, heated air in the example shown, is pumped directly into one end of the plenum chambers 3, 4 from outside the treatment chamber 2 and is directed against both surfaces of the web through nozzles 6. Both plenum chambers again have baffles located within them to vary their effective length.

When the treatment chamber is positioned horizontally, a conveyor could pass horizontally through the treatment chamber along a path spaced below a single horizontal row of spaced apart ducts extending laterally from the plenum chamber. The plenum chamber again has a movable baffle for controlling the number of ducts to which treating medium is supplied from the plenum chamber for treating material or articles carried by the conveyor through the treatment chamber. The baffle can be moved to control the effective length of the plenum chamber and thus the area of the surface of the material on which the treating medium is directed.

The apparatus is particularly suitable for drying fabric material but can also be used for drying or treating other web materials such as paper, metal webs, or plastic materials, etc.

I claim:

1. An apparatus for treating material comprising a substantially enclosed treatment chamber, means for passing the material through the treatment chamber, means for directing a treating medium against at least one surface of the material during its passage through the chamber, said directing means including a plenum chamber within the enclosed chamber, means for supplying the treatment medium to the plenum chamber, and movable means within the plenum chamber for varying its effective length, to thereby vary the length of the surface of the material within the treatment chamber against which the medium is directed, and wherein the means for supplying the treatment medium comprises an inlet located at or adjacent one end of the plenum chamber and the movable means comprise a baffle mounted in movable, sealing relation with the walls of the plenum chamber for blocking the flow of treatment medium past it.

2. An apparatus as claimed in claim 1, wherein said directing means include a plurality of ducts extending from, and in communication with, the plenum chamber, and nozzles in the ducts for impinging the treating medium against the surface of the material.

3. An apparatus as claimed in claim 1, including an endless conveyor carrying the material through the treatment chamber, the treatment chamber having an inlet and an outlet end for permitting passage of the conveyor belt therethrough while maintaining the chamber substantially closed, the treatment chamber being located substantially horizontally, and the plenum chamber extending closely adjacent a substantial portion of the area of the conveyor belt within the treatment chamber.

4. An apparatus as claimed in claim 1, wherein the material being treated comprises a web, and means including guide rollers for passing the web through the treatment chamber.

5. An apparatus as claimed in claim 1, including a plurality of spaced apart nozzles in at least one surface of the plenum chamber for directing the treating medium against the surface of the material passing through the treating chamber.

6. An apparatus for drying a web, comprising, means forming an elongated enclosed chamber, means for conveying material to be treated in a straight path through said chamber, ducts entering the chamber for distributing treating air therein, means for introducing air from an outside source to said ducts, said air supply means having heating means and fan means communicating with the ducts, a pair of supply plenums communicating with the ducts and extending substantially the length of the enclosed chamber parallel to and at respective sides of the path of the material, baffles movable within the plenums to vary their effective length, drive means adapted to move the baffles within the plenums, a plurality of air distribution pipes extending from the plenums, and means far varying the position of the baffles within said plenums whereby the effective length of the plenums may be adjusted.

7. An apparatus for drying a web as claimed in claim 6, in which the drive means for the baffles in the respective plenums is connected thereby to drive the baffles in unison within the respective plenums.

8. An apparatus for drying a web, as claimed in claim 6, in which the enclosed chamber has a pair of air return pipes, said air return pipes communicating with the air supply means whereby the air in the return pipes is recirculated through the heaters and fans for further distribution to the plenums and distribution pipes.

9. An apparatus for drying a web, as claimed in claim 6, in which the enclosed chamber has a pair of air return pipes, said air return pipes communicating with the air supply means whereby the air in the return pipes is recirculated through the heaters and fans for further distribution to the plenums and distribution pipes, and in which the air return pipes are in communication with the plenum supply ducts by means of a pair of by-pass pipes, air in the return pipes being prevented from entering the plenum supply ducts by means of adjustable baffles located within the by-pass pipes.

10. An apparatus for drying material comprising, an elongated enclosed chamber, means for conveying material to be treated in a path through said chamber, duct means entering the chamber for distributing treating air therein, means for introducing air from an outside source to said duct means, a supply plenum parallel to the path of the material and communicating with the duct means, a baffle movable within said plenum to vary the effective length thereof, air distribution means leading from said plenum to said chamber to distribute treating air to the material, and control means for varying the position of the baffle within the plenum to adjust the effective length of the plenum, and in which the baffles are adapted to be slideably moved within the plenums, the baffles provided with sealing means, said sealing means comprising strips of sealing material attached to the baffles whereby the sealing strips reduce the leakage of air.

11. An apparatus for drying material as claimed in claim 10, in which the air distribution pipes from the plenums are provided with slots extending the length thereof, said air distribution pipes being circular in cross-section, the slots being adapted to direct the treating air to the surface of the material.

12. An apparatus for drying material as claimed in claim 9, in which the control means for varying the position of the baffle within the plenum is automatically responsive to changes in material speed, said control means being adapted to relay signals to a baffle drive means thus adjusting the position of the baffle within the plenum as the material speed is changed to obtain uniform drying of the material.

13. An apparatus for drying a web, comprising, means forming an elongated enclosed chamber, means for conveying the web to be treated in a path through said chamber, at least one duct entering the chamber for distributing treating air therein, air supply means from an outside source, said air supply means having heating means and fan means communicating with the duct, a plenum communicating with said duct, said plenum extending substantially the length of the enclosed chamber and parallel to the path of the web, a baffle movable within the plenum to vary the effective length of the plenum, a drive means adapted to move the baffle within the plenum, a plurality of air distribution ducts being substantially rectangular in shape, the air distribution ducts having slots extending the length thereof and located on both sides of said ducts, the slots being adapted to direct the treating air to the surface of the web, and means for varying the position of the baffle within the plenum whereby the effective length of the plenum may be adjusted to compensate for variations in web speed.

14. An apparatus for drying a web as claimed in claim 13, in which the means for conveying the web comprises drive means adapted to convey the web through the chamber twice, thus allowing the treating air from both sides of the ducts to be directed against the web at two different locations.

15. An apparatus for drying a web, comprising, means forming an elongated enclosed chamber, means for conveying the web to be treated in a path through said chamber, a pair of ducts within the chamber along said path for distributiong treating air therein, air supply means for introducing air from an outside source to said ducts, said air supply means having at least one heating means and at least one fan means communicating with the ducts, a pair of supply plenums extending substantially the length of the enclosed chamber and parallel to the path of the web, said plenums communicating with the ducts, said plenums being substantially rectangular in cross-section, the plenums being provided with a plurality of air distribution slot means for directing the treating air to the web, a pair of baffles movable within the plenums, said baffles being provided with sealing means, said baffles being movable in unison within the plenums to vary the effective length thereof, drive means adapted to move the baffles within the plenums, and means for automatically varying the position of the baffles within the plenums whereby the effective length of the plenums may be adjusted to compensate for variations in web speed.

References Cited

UNITED STATES PATENTS

| | | | |
|---|---|---|---|
| 2,230,826 | 2/1941 | Burdett et al. | 431—202 |
| 2,807,096 | 9/1957 | Kullgren et al. | 34—155 X |
| 3,287,815 | 11/1966 | Yunghahn | 34—155 X |

JOHN J. CAMBY, Primary Examiner

U.S. Cl. X.R.

34—155